United States Patent [19]
Huskins et al.

[11] 3,940,474
[45] Feb. 24, 1976

[54] GENERATION OF HYDROGEN

[75] Inventors: Chester W. Huskins, Huntsville; Roy E. Patrick, Redstone Arsenal, both of Ala.

[73] Assignee: The United States of America as represented by the Secretary of the Army, Washington, D.C.

[22] Filed: Aug. 6, 1974

[21] Appl. No.: 405,152

[52] U.S. Cl. ................................................. 423/648
[51] Int. Cl.² ............................................ C01B 1/03
[58] Field of Search ................................... 423/648

[56] References Cited
UNITED STATES PATENTS
3,350,884   11/1967   Colombani et al. ............ 423/648 X OTHER PUBLICATIONS
"Treatise on Inorganic Chemistry," by H. Remy, Vol. 1, 1956, p. 361, Elsevier Pub. Co., N.Y.

"Chemistry of the Hydrides," D. T. Hurd, 1952 Ed., p. 97, John Wiley & Sons, Inc. N.Y.

"Hydrogen Compounds of the Metallic Elements" by K. M. Mackay, 1966, p. 183, E. & F. N. Spon Ltd., London.

"Metal Hydrides," by Mueller Elements,"al., 1968, pp. 579 MacKay 580, Academic Press, N.Y.

*Primary Examiner*—Edward Stern
*Attorney, Agent, or Firm*—Nathan Edelberg; Robert P. Gibson; Jack W. Voigt

[57] ABSTRACT

Unsolvated aluminum hydride is decomposed by a controlled heating method to yield pure hydrogen useful in chemical lasers and as an energy source.

4 Claims, No Drawings

GENERATION OF HYDROGEN

DEDICATORY CLAUSE

The invention described herein may be manufactured, used, and licensed by or for the Government for governmental purposes without the payment to us of any royalties thereon.

BACKGROUND OF THE INVENTION

This invention relates to a method of producing high purity hydrogen, generally at the time the pure hydrogen is required, for chemical lasers or for an energy source.

With recent interests in chemical lasers the degree of purity of the reactant and the need to produce the reactant at the time of use with the high degree of purity required are of particular concern.

Hydrogen is used in large quantities in industry, usually, from compressed gas storage containers which are hooked up to a manifold which serves to direct the gas through a control valve where the flow rate is controlled for use. The level of purity of hydrogen gas from this source has been found to be not adequate for laser use without further purification. The laser use requires the highest purity of reactants which react to form a chemical compound while at least one of the reactants is in an excited energy state. The formed compound emits coherent radiation energy while returning to ground state.

The system employing metal hydrides such as lithium aluminum hydride, sodium borohydride, etc. as a source of hydrogen generally requires a catalyst to effect decomposition. In this system there are a number of opportunities to contaminate the hydrogen generated.

Desirable would be a method which can be employed to generate high purity hydrogen for chemical lasers or for a high purity energy source.

Advantageous would be a method which can be employed to generate hydrogen on a continuous basis or on an incremental basis to yield high purity hydrogen.

Therefore, an object of this invention is to provide a method for generating high purity hydrogen for chemical lasers.

Another object of this invention is to provide a method for generating high purity hydrogen from a solid chemical compound which does not require a catalyst to effect decomposition and which decomposes rapidly over a narrow temperature range.

SUMMARY OF THE INVENTION

Unsolvated aluminum hydride is used as a source for preparation of pure hydrogen. The method of this invention employs an unsolvated aluminum hydride such as aluminum hydride 58 or aluminum hydride 1451. The designation 58 designates the aluminum hydride having maximum absorption in the infrared at 5.8 microns and is commonly referred to as aluminum hydride 58. The designation of 1451 relates to the x-ray diffracting characteristics for aluminum hydride which is an unsolvated aluminum hydride 58 or equivalent. Aluminum hydride 58 and aluminum hydride 1451 are commercially available in quantities.

Aluminum hydride 58 or 1451 is decomposed by heating to about 180°C. The decomposition is endothermic in the absence of air. In the presence of air, the decomposition is exothermic in that $Al_2O_3$ is formed.

The method of this invention comprises placing small wafer pellets of unsolvated aluminum hydride or unsolvated aluminum hydride in powder form in a container that can be evacuated or purged with an inert gas such as nitrogen before applying heat to decompose the aluminum hydride to yield pure hydrogen and aluminum metal. The evacuation of the container is the preferred procedure where highest purity of hydrogen is required for laser use or where maximum yield is desired. However, if highest purity is not required, such as for a fuel source, the decomposition could be effected in air where the reaction is exothermic due to the formation of $Al_2O_3$.

DESCRIPTION OF THE PREFERRED EMBODIMENT(S)

Unsolvated aluminum hydride is placed in a container which is adapted for operating in an inert or vacuum environment and which can be heated rapidly to the decomposing temperature range of 180° – 185°C. For the purpose of gathering data and yielding a small quantity of high purity hydrogen the following conditions were employed.

EXAMPLE

A piece of wire (high-melting point, comprised of about Ni 80%, Cr 20%) with a diameter of about 0.032 inch is positioned in the approximate center of a tube (length wise) of about one-half inch diameter and about 3 inches long. Unsolvated aluminum hydride powder is then placed in the tube to surround the wire which is heated electrically to effect decomposition of the aluminum hydride. Heat is applied as long as decomposition is desired to liberate hydrogen gas or until about a 10% loss in weight is achieved when the decomposition takes place in an inert or vacuum environment. The decomposition rate is a factor of the surface contact between the heater and the $AlH_3$. The decomposition process is monitored by determining the amount of hydrogen being produced over a time interval. Table I shows the results in percent decomposition at various time intervals from start of decomposition.

TABLE I

| % Decomposition | Time (from start of electrical heating) (Seconds) |
|---|---|
| 25 | 15 |
| 50 | 40 |
| 75 | 90 |
| 90* | 140 |

*90% being also the amount of the theoretical yield of hydrogen produced.

Since $AlH_3$ is approximately 90% aluminum and 10% hydrogen the decomposition process is 100% complete with a 10% decrease in weight where the decomposition takes place under a vacuum.

Table II contains decomposition data which indicates that the quantitative yield of hydrogen is in the range of 10% and the ΔH calculated from differential thermal analysis data (DTA) is in the range of 134 calories/gram.

TABLE II

| | DECOMPOSITION DATA | |
|---|---|---|
| Sample Size | Weight Loss % | ΔH Calories/Gram |
| (Mg) | | |
| 3.77 | 9.5 | 128 |
| 3.75 | 10.8 | 116 |

TABLE II-continued

| Sample Size | DECOMPOSITION DATA Weight Loss % | ΔH Calories/Gram |
|---|---|---|
| 4.40 | 9.7 | 123 |
| 3.68 | 10.5 | 134 |
| 3.90 | 9.7 | 128 |

The advantages of the method of this invention are:
1. Hydrogen liberated is of high purity;
2. Use of solid material to produce pure hydrogen offers an advantage in transportation and storage; and,
3. The production of hydrogen can be on a continuous basis or batch quantity with a wide variation in the output of hydrogen from a very trace amount to a large amount which is based on the quantity of $AlH_3$ to be decomposed and the surface area contact between the heater wire and the $AlH_3$.

Although, $AlH_3$ 58 and $AlH_3$ 1451 can be made by a number of methods including the method disclosed in U.S. Pat. No. 3,751,566, the widely accepted methods include reacting an etheral solution of an alkali metal aluminum hydride with either a boron trihalide or aluminum chloride or an ether-aromatic solvent solution of an alkali metal aluminum hydride with the specified reactants. The aluminum hydride solution produced is concentrated in a vacuum precipitator forming a slurry of aluminum hydride etherate. Ethereal solutions of lithium aluminum hydride, lithium magnesium aluminum hydride, and lithium borohydride are added to the slurry in the proper amounts. The slurry is then fed to a continuous crystallizer to form the desired magnesium dopped aluminum hydride, $AlH_3 - 1451$. Magnesium improves thermal and storage stability. The magnesium dopped aluminum hydride is not required if the material is not to be stored or to be compounded with other compounds.

$AlH_3 - 1451$ is very stable, can be handled safely in the air, and is not rapidly affected by moisture. These properties and the fact that $AlH_3$ has a sharp decomposition temperature gives $AlH_3$ a distinct advantage over $LiAlH_4$, $NaAlH_4$, $NaBH_4$ etc. which compounds are combustible in air and very reactive with water. The latter compounds are, in most cases, rather stable to heat and require a catalyst to give decomposition to hydrogen. The catalyst is a source of impurities in the liberated hydrogen. Further, the decomposition is slow and incomplete, generally because of possible side reactions which may occur.

Although the high purity of hydrogen required in laser use can be produced by the method of this invention, high purity hydrogen can also be produced for fuel cell use or for any other use where a high level of purity is required. Where the highest level of purity of hydrogen is not required, the method of this invention could employ some of the hydrides which do not have the high purity such as the aluminum hydride 1451 or aluminum hydride 58, and other aluminum hydrides such as aluminum hydride 57, 59, and 60. Also, the method can be conducted in air if the highest purity of hydrogen gas is not required. The method conducted in air would lessen the heat requirement because of the secondary reaction which is exothermic.

We claim:
1. A method of generating hydrogen gas of high purity as required for chemical laser use, said method comprising:
   i. placing a predetermined quantity, in powder form of unsolvated aluminum hydride selected from an unsolvated aluminum hydride that has a maximum absorption in the infrared at about 5.8 microns or that has an x-ray diffracting value of about 1451 in a container which is adapted for operating in an inert or vacuum environment;
   ii. providing a heat source that includes a length of wire of predetermined diameter, a high melting point and of a predetermined composition of about 80% nickel and of about 20% chromium, said wire being adapted for electrically heating and said wire being positioned in contact with said unsolvated aluminum hydride under an inert or vacuum environment to rapidly bring said unsolvated aluminum hydride to a decomposition temperature range of from about 180° to about 185°C; and
   iii. maintaining said temperature range for sufficient time to effect decomposition of said unsolvated aluminum hydride to liberate a desired quantity of hydrogen gas from said predetermined quantity of unsolvated aluminum hydride.
2. The method of claim 1 wherein said decomposition takes place in an inert environment and said predetermined diameter of wire is about 0.032 inch.
3. The method of claim 1 wherein said decomposition takes place under a vacuum environment and predetermined diameter of wire is about 0.032 inch.
4. The method of claim 1 wherein said heating rate effects a decomposition such that about 25 percent of said decomposition takes place in about 15 seconds from start of said electrical heating, about 50 percent of said decomposition takes place in about 40 seconds from start of said electrical heating, about 75 percent of said decomposition takes place in about 90 seconds from start of said electrical heating, and about 90 percent of said decomposition takes place in about 140 seconds from start of said electrical heating, said 90 percent decomposition being the amount of theoretical yield of hydrogen produced.

* * * * *